(12) United States Patent
Pradeep (10) Patent No.: US 11,424,843 B2
(45) Date of Patent: Aug. 23, 2022

(54) CELLULAR SIGNAL DEGRADATION BASED DETECTION OF EVENTS

(71) Applicant: Anantha K. Pradeep, Piedmont, CA (US)

(72) Inventor: Anantha K. Pradeep, Piedmont, CA (US)

(*) Notice: Subject to any disclaimer, the term of this patent is extended or adjusted under 35 U.S.C. 154(b) by 76 days.

(21) Appl. No.: 17/111,970

(22) Filed: Dec. 4, 2020

(65) Prior Publication Data

US 2022/0182159 A1 Jun. 9, 2022

(51) Int. Cl.
| | |
|---|---|
| *H04W 24/10* | (2009.01) |
| *H04B 17/318* | (2015.01) |
| *H04W 24/08* | (2009.01) |
| *H04W 24/04* | (2009.01) |

(52) U.S. Cl.
CPC .......... *H04B 17/318* (2015.01); *H04W 24/04* (2013.01); *H04W 24/08* (2013.01); *H04W 24/10* (2013.01)

(58) Field of Classification Search
CPC .................................................... H04W 24/10
USPC .......................................................... 370/329
See application file for complete search history.

(56) References Cited

U.S. PATENT DOCUMENTS

2022/0110155 A1* 4/2022 Chou ................... H04W 24/02

OTHER PUBLICATIONS

Luxing Qin et al., "An Effective Method for Forest Fire Smoke Detection," 2019 J. Phys.: Conf. Ser. 1187 052045, 9 pages.
Panagiotis Barmpoutis, et al., "A Review on Early Forest Fire Detection Systems Using Optical Remote Sensing," Centre for Research and Technology Hellas, Information Technologies Institute, Oct. 15, 2020; 26 pages.

* cited by examiner

*Primary Examiner* — Dang T Ton
(74) *Attorney, Agent, or Firm* — Kwan & Olynick LLP (57) ABSTRACT

Methods and apparatus are provided for determining first frequency band signal strengths and second frequency band signal strengths for multiple devices connected to a cellular base station. Variations that fall within a threshold for the first frequency band signal strength and outside the threshold for second frequency band signal strengths may indicate a casual factor attenuating signals more at one frequency than the other. Alerts can be triggered for the causal factor to further verify the causal factor or notify appropriate authorities.

20 Claims, 7 Drawing Sheets

Monitoring Information for Cellular Base Station Connected Devices 300

| Device Connected to Cellular Base Station | Location | Frequency | Signal Strength | Outside Threshold |
|---|---|---|---|---|
| Device 301 | Location 1 | 600MHz | -90dBm | y |
| Device 303 | Location 3 | 600MHz | -85dBm | y |
| Device 305 | Location 5 | 600MHz | -110dBm | y |
| Device 307 | Location 7 | 600MHz | -102dBm | y |
| Device 309 | Location 9 | 600MHz | -76dBm | n |
| Device 311 | Location 11 | 600MHz | -72dBm | n |
| Device 313 | Location 13 | 1900MHz | -87dBm | y |
| Device 315 | Location 15 | 1900MHz | -99dBm | y |
| Device 317 | Location 17 | 1900MHz | -102dBm | n |
| Device 319 | Location19 | 1900MHz | -114dBm | y |
| Device 321 | Location 21 | 1900MHz | -69dBm | n |
| Device 323 | Location 23 | 1900MHz | -70dBm | n |
| Device 325 | Location 25 | 1900MHz | -90dBm | n |
| Device 327 | Location 27 | 1900MHz | -105dBm | n |
| Device 329 | Location 29 | 1900MHz | -95dBm | n |
| Device 331 | Location 31 | 1900MHz | -91dBm | n |

CELLULAR SIGNAL DEGRADATION BASED DETECTION OF EVENTS

BACKGROUND

Wildfires and other natural and manmade disasters cause billions of dollars of monetary and non-monetary losses every year. Some of the losses could be mitigated if we had better early detection and monitoring systems. Efforts have been made to increase video monitoring of wildfire prone areas, especially wildfire prone areas near human residences. In some areas, hundreds of observation towers have been built and equipped with camera systems to monitor forested areas. Recorded images and videos are analyzed for hazardous events. If a fire or other hazardous event is detected, alarms are triggered for the appropriate authorities. Other efforts have focused on gas sensors and thermal cameras mounted on unmanned aerial vehicles (UAVs). The UAVs can be flown to scout the boundaries of fires and to find the origin of reported smoke. Blimps can also be equipped with gas sensors and thermal cameras to monitor larger areas from higher altitude.

Other sensors such as microwave radiometers and gas and smoke detectors have also shown some effectiveness in locating fires in low visibility areas. However, current fire detection technologies have many problems. One problem is insufficient coverage. Sensor towers and cameras are expensive to build and maintain, particularly in remote areas. Vast swaths of nature remain unmonitored. Existing technologies also suffer from lack of sensitivity or too much sensitivity. Lack of sensitivity can result from insufficient coverage while too much sensitivity can result in false alarms from pollen clouds, crop dusting, dust storms, fog, water plumes, industrial exhaust, etc.

Consequently, it is desirable to augment existing technologies with enhanced disaster detection, monitoring, and mitigation systems.

Overview

Provided are various mechanisms and processes relating to detecting events using cellular signal degradation. In some embodiments, which may include at least a portion of the subject matter of any of the preceding and/or following examples and aspects, existing cellular networks are used to augment disaster detection and mitigation systems. Particular frequency bands of cellular signals are attenuated to differing degrees depending on the type of interference. It is recognized that particular types of smoke and emissions associated with disasters can attenuate cellular signals more at certain frequencies than others. By determining frequency attenuation characteristics of signals from devices connected to particular cellular base stations, information can be obtained for early detection and monitoring of environmental changes in the area covered by the cellular base station. Environmental changes such as smoke from possible fires can trigger alerts to appropriate authorities to confirm or respond to the potential disaster.

Various embodiments relating to processes and systems of detecting events using cellular signal degradation are described further below with reference to the figures.

DETAILED DESCRIPTION OF EXAMPLE EMBODIMENTS

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Fires and other natural or man-made hazards, especially widespread ones and those not easily contained, pose many threats to the community. They can cause damage to property, threaten lives, uproot people from their homes, and cause detrimental effects to the health and environment of the greater community, such as through poor air quality that can spread much further than the perimeter of the fires or other hazards. Furthermore, fighting fires and other hazards can be very costly to contain and extinguish, by requiring the help of many firefighters, first responders, authorities and resources.

If fires or other hazards are not detected early, they can grow into much larger and widespread fires that can be more difficult to contain and take much more time and resources to control and extinguish. Accordingly, it is beneficial to detect fires early when they are easier to contain. However, current fire detection technologies are very limited.

Current fire detection technologies have many problems, such as insufficient coverage, lack of sensitivity, and/or too much sensitivity. For instance, because sensor towers and cameras are expensive to build and maintain, particularly in remote areas, vast swaths of nature remain unmonitored. These unmonitored areas result in insufficient coverage and can further result in lack of sensitivity in overall detection, because fires located in these unmonitored areas can grow significantly before they can be detected in monitored areas or through other means. In other examples, too much sensitivity in detection can result in false alarms from events such as pollen clouds, crop dusting, dust storms, fog, water plumes, industrial exhaust, etc.

Accordingly, various systems, mechanisms, and processes are presented herein to augment existing technologies with enhanced disaster detection, monitoring, and mitigation systems. In particular, numerous embodiments are described that include various features that can be used alone or in combination with each other and existing technologies. Furthermore, various example embodiments are intended to be illustrative of particular implementations, and it should be noted that other embodiments and implementations are also intended be included within the scope of the present description.

System Examples

Figure 1:
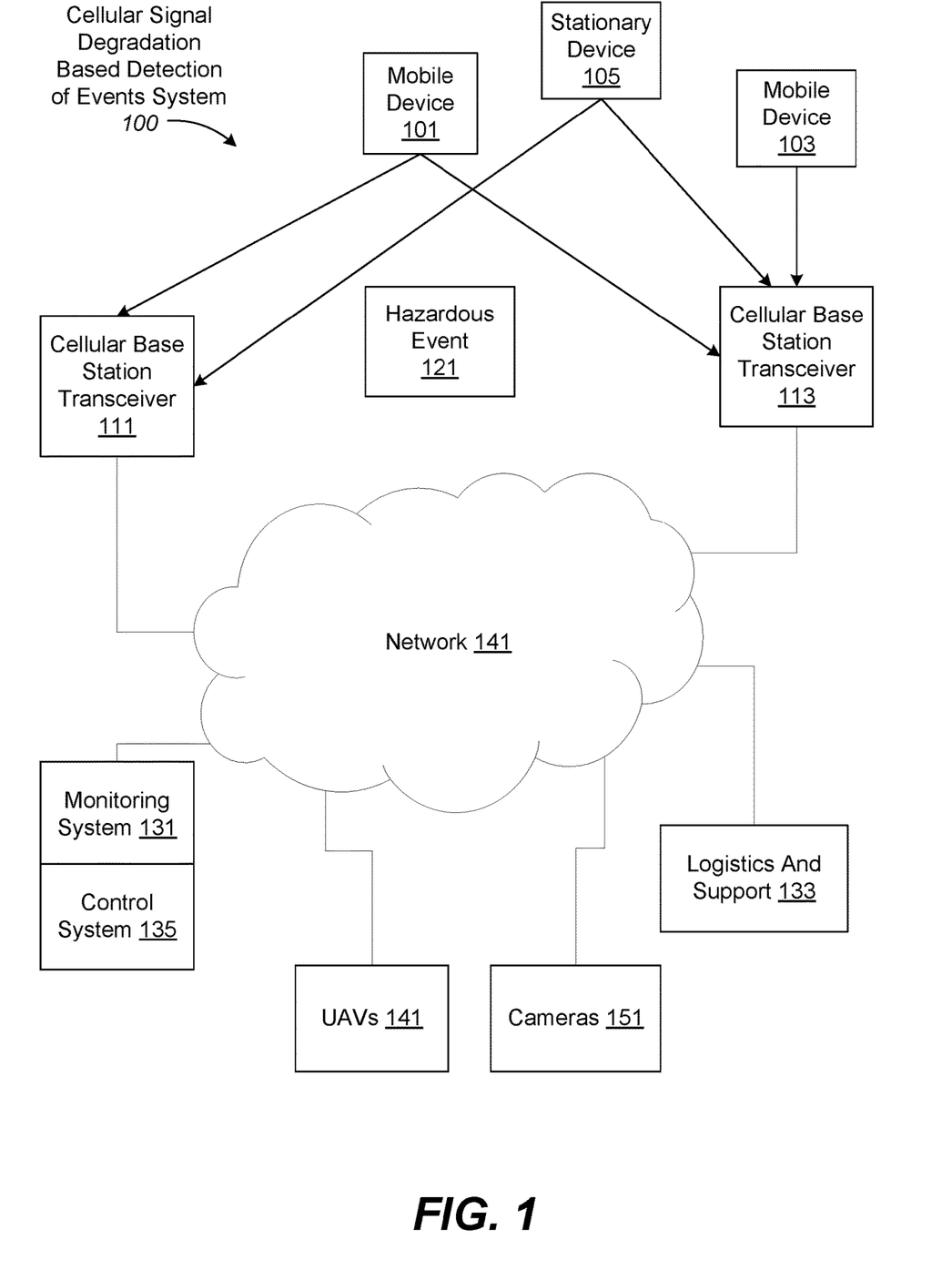
FIG. 1 illustrates one example of a system that can be used to enhance disaster detection and mitigation.

With reference to FIG. 1, shown is one embodiment of a system 100 that can be used to enhance disaster detection and mitigation. In this example, a hazardous event 121, such as a fire, smoke, severe weather, etc., is identified by the system 100 based on a detection of cellular signal degradation in the area of the hazardous event 121. In particular, a cellular base station transceiver 111 monitors signal strengths at a first frequency band and a second frequency band for multiple devices. According to various implementations, the cellular base station transceiver 111 is a cellular-enabled mobile device site where antennas and electronic communications equipment connect multiple devices to a base station network.

In the present embodiment, the devices monitored by cellular base station transceiver 111 include mobile device 101, mobile device 103, and stationary device 105. Some examples of mobile and stationary devices include cellular phones, pagers, smartphones, smartwatches, tablets, notebooks, laptop computers, desktop computers, smart televisions, and other devices that transmit signals to and receive signals from the cellular base station transceiver. Depending on the implementation, some or all of the devices can be mobile, stationary, or a combination of mobile and stationary devices. In some examples, the devices are relatively unchanging in location. According to various embodiments, the devices may be designated nodes that are placed and controlled by administrators of system 100, and in other examples some or all of the devices may be user owned devices. Although three particular devices 101, 103, and 105 are included in the present example, any number of devices can be used according to various implementations.

According to various embodiments, the cellular base station transceiver 111 monitors signal strengths at a first and second frequency band for multiple devices 101, 103, and 105 that are connected to the first cellular base station transceiver 111. In the present example, a monitoring system 131 uses signal strength information collected by cellular base station transceiver 111 at the first and second frequency bands to detect signal strengths that fall within a threshold variation and signal strengths that exceed the threshold variation. In a particular implementation, monitoring system 131 detects variation in the signal strengths at the first frequency band that fall within a threshold variation and detects variation in the signal strengths at the second frequency band that exceed the threshold variation. Additionally, as shown, other cellular base station transceivers 113 can also be included in the system to monitor the multiple devices at various frequency bands, depending on the particular implementation of the system. In some examples, information gathered from other cellular base station transceivers 113 can be used to confirm or supplement information gathered from cellular base station transceiver 111.

In some embodiments, the monitoring system 131 generates a signal strength profile at the first frequency band for the connected devices 101, 103, and 105. The monitoring system 131 can also generate a signal strength profile at the second frequency band for the connected devices 101, 103, and 105. These signal strength profiles can then be used to determine an expected threshold variation during clear, non-hazardous conditions for the first and second frequency bands.

According to various embodiments, a threshold variation can be determined based on the observed signal strengths at the first frequency band and the second frequency band during clear, non-hazardous conditions. In one example, if the threshold variation is set to plus or minus 15 dBm, then variations in signal strength beyond 15 dBm would exceed the threshold variation. In another example, if the threshold variation is set to plus or minus 25 dBm, then variations in signal strength beyond 25 dBm would exceed the threshold variation. Depending on the particular implementation, the expected threshold variations may differ for different frequency bands.

Because hazardous events can cause changes in the signal strengths detected at various frequency bands, detecting a change or deviation in signal strength can indicate the existence of a particular hazardous event. Because different hazardous events, such as ash particles in the air, smoke, moisture, etc., have different characteristics, they may each cause a different variation in signal strength at various frequency bands. Accordingly, based on the particular variation in signal strength detected, a specific type of hazardous event associated with that particular variation can be detected.

In the present embodiment, if a variation in the signal strengths at the second frequency band exceeds the threshold variation, while the variation in the signal strengths at the first frequency band falls within the threshold variation, a control system 135 determines a causal factor for the variation in the signal strengths at the second frequency band. For example, the causal factor may be determined to be wildfire smoke from burning of natural substances that affects transmission strength at the second frequency band more than at the first frequency band. In another example, the causal factor may be determined to be smoke from burning of synthetic materials that affects transmission strength at the second frequency band more than at the first frequency band. In yet another example, the causal factor may be determined to be a weather event that affects transmission strength at the second frequency band more than at the first frequency band. Similarly, other causal factors can be detected based on the particular variation in signal strengths at the second frequency band that exceed the threshold variation.

In some examples, a causal factor for a variation in signal strength can be determined or confirmed by one or more techniques. For instance, cameras 151 located near the location of the device experiencing signal attenuation can be used to collect information such as photos, videos, etc. that can be used to supplement the collected data and help determine a causal factor. For instance, a camera can stream or record footage that shows smoke at the location of the attenuated signal, and this information can be used to determine that smoke is a causal factor. Depending on the implementation of the system, cameras 151 can be fixed, mobile, relatively fixed, or placed in some other desirable configuration.

Additionally, other techniques for gathering information about a causal factor may include using unmanned aerial vehicles (UAVs) 141. For instance, UAVs can be sent to a location of interest to collect data with one or more cameras and/or sensors.

Specifically, UAVs can travel to the location and be maneuvered to gather video footage, photos, and/or sensor data such as heat, humidity, and visibility measurements that can help to determine a cause for a detected signal attenuation.

According to various embodiments, the control system 135 also triggers an alert for a causal factor once it is determined. Specifically, this alert can be sent to appropriate authorities. In some examples, the alert is sent to a logistics and support 133 entity. For instance, an alert can be sent to a public agency such as a fire station, forestry station, or other monitoring entity. In other examples, this alert can be sent to a control center or administrator of the system 100, which can be a private entity, company, or individual. Depending on how the system 100 is designed for a particular area, one or more logistics and support 133 entities may be alerted by control system 135.

Figure 2:
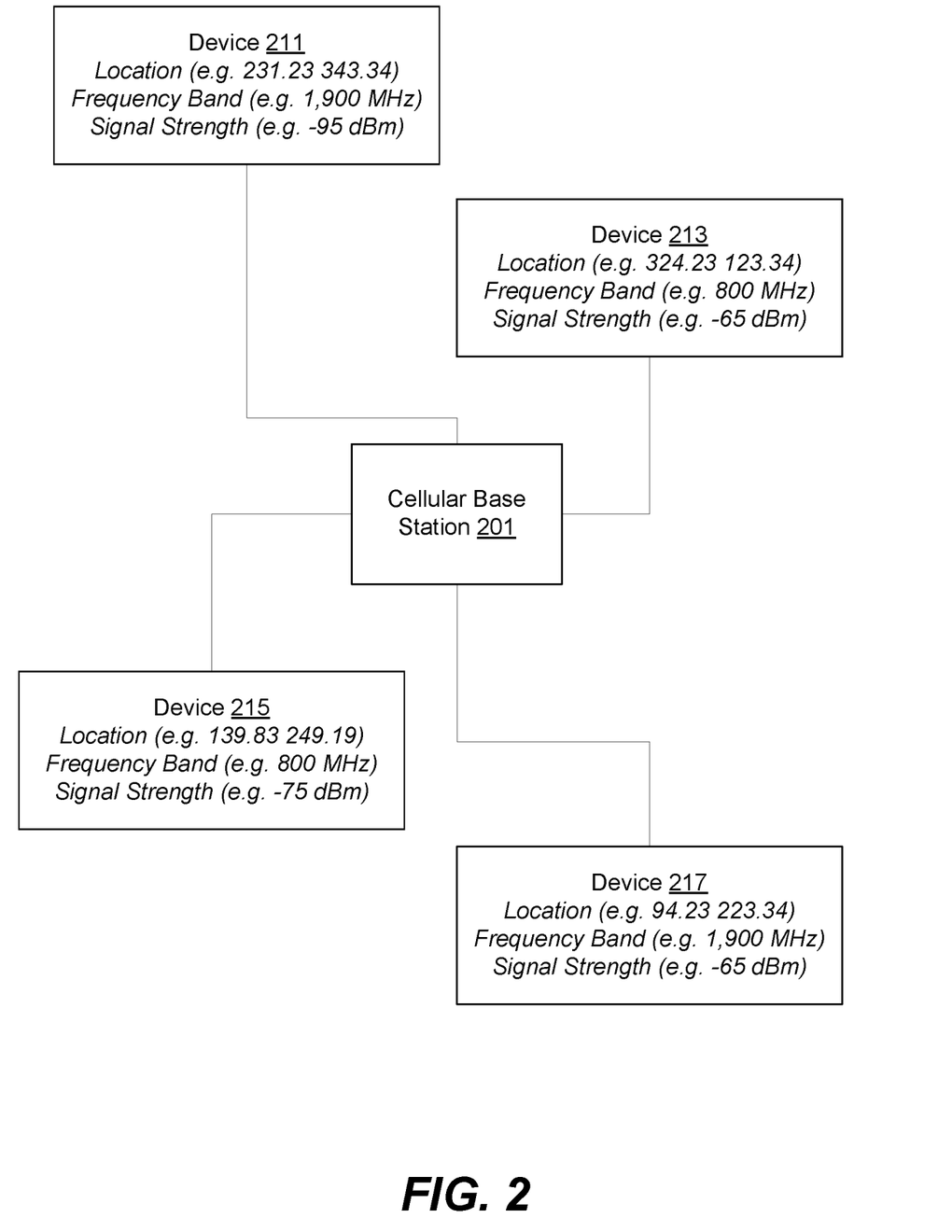
FIG. 2 illustrates one example of devices connected to a cellular base station.

With reference to FIG. 2, shown is one example of a set of devices connected to a cellular base station. As described above, a set of devices can be monitored from a cellular base station to gather information about signal strength of each of the devices. This information can then be used to deduce whether signal strength has been possibly affected by a hazardous event somewhere in the vicinity of the cellular base station and device(s). As illustrated in the present embodiment, devices 211, 213, 215, and 217 are connected to cellular base station 201. Cellular base station 201 monitors information associated with each device 211, 213, 215, and 217, such as location, frequency band, and signal strength. Of course, other information can be monitored as well in some embodiments.

According to various embodiments, location, frequency band, and signal strength can be obtained for each of the devices at a given time. In some implementations, this information is monitored at specific times, specified time intervals, or continuously.

However, this information can be monitored depending on the desired implementation. In the present example, examples of location, frequency band, and signal strength are indicated for each of the devices 211, 213, 215, and 217 at a particular time. In particular, information obtained about device 211 includes location 231.23 343.34, frequency 1,900 MHz, and signal strength −95 dBm. Information obtained for device 213 includes location 324.23 123.34, frequency band 800 MHz, and signal strength −65 dBm. Furthermore, information obtained for device 215 includes location 139.83 249.19, frequency band 800 MHz, and signal strength −75 dBm. Information obtained for device 217 includes location 94.23 223.34, frequency band 1,900 MHz, and signal strength −65 dBm.

Figure 3:
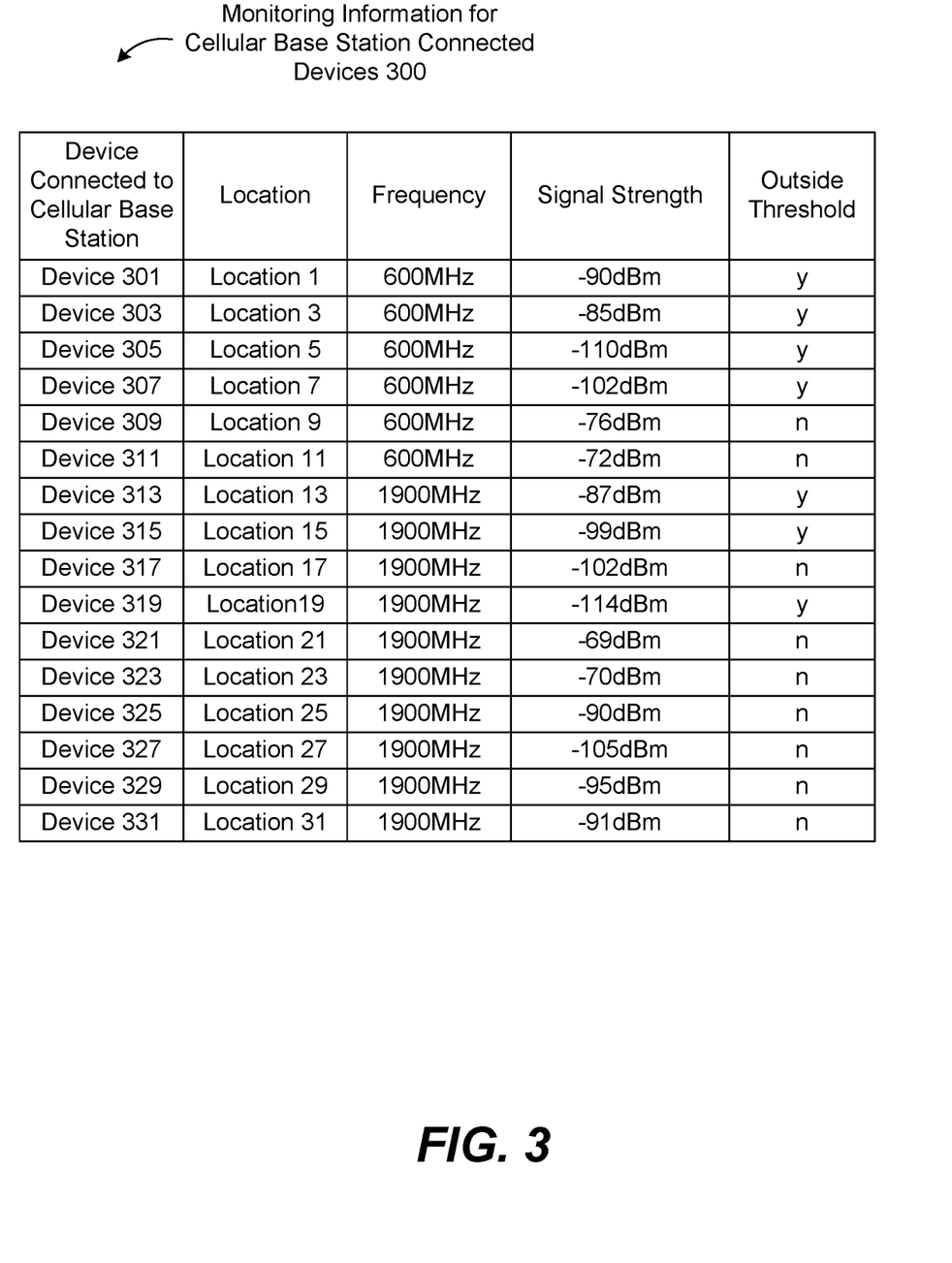
FIG. 3 illustrates one example of a mechanism for tracking signal strengths for devices connected to a cellular base station.

With reference to FIG. 3, shown is an illustration of a mechanism for tracking signal strengths for devices connected to a cellular base station. In the present example, monitoring information for cellular base station connected devices is collected, as displayed in a table 300. As depicted in table 300, the monitoring information collected includes location, frequency, and signal strength information for each device 301, 303, 305, 307, 309, 311, 313, 315, 317, 319, 321, 323, 325, 327, 329, and 331. Furthermore, the table 300 also includes information about whether the signal strength for each device 301, 303, 305, 307, 309, 311, 313, 315, 317, 319, 321, 323, 325, 327, 329, and 331 falls outside a designated threshold variation.

As described above with regard to FIG. 2, this threshold variation can be designated based on the observed signal strengths at the chosen frequency bands during clear, non-hazardous conditions. As also described above, if variation in detected signal strength falls outside of this threshold, this variation may indicate the existence of a hazardous event. As described in more detail below with regard to FIG. 4, this information can then be used to determine possible causal factors for the variation. In particular, depending on the information gathered about signal strength variation over different frequency bands and at different locations, a causal factor can be determined. For instance, if a signal strength variation exceeds the threshold variation for a particular frequency band but does not exceed the threshold variation for another frequency band, this may suggest a possible causal factor, such as fire, smoke, rain, etc., that correlates to this variation at the observed frequency bands.

In the present embodiment, information is gathered 300 for devices 301, 303, 305, 307, 309, 311, 313, 315, 317, 319, 321, 323, 325, 327, 329, and 331 at a particular time at two different frequency bands. In particular, devices 301, 303, 305, 307, 309, and 311 are monitored for signal strengths at a frequency of 600 MHz. At the time that the data is collected, the signal strengths measured for devices 301, 303, 305, and 307 fall outside of the threshold, while the signal strengths measured for devices 309 and 311 fall within the threshold. At this same time, the signal strengths of devices 313, 315, 317, 319, 321, 323, 325, 327, 329, and 331 are monitored for signal strengths at a frequency of 1900 MHz. At the time that the data is collected, the signal strengths measured for devices 313, 315, and 319 fall outside of the threshold, while the signal strengths measured for devices 317, 321, 323, 325, 327, 329, and 331 fall within the threshold.

In the present example, the monitoring information 300 includes measurements taken at a particular time. Based on this information, some determinations can be made about whether a possible hazardous event is occurring at that particular time. For instance, taking into consideration whether one or more of the devices have signal strengths outside of the designated threshold can indicate that a hazardous event may be present. If several devices have signal strengths outside the designated threshold, this may be an even stronger indicator of the hazardous event. In some examples, the location information of the devices may also be used to determine the location of the hazardous event. When taken together, the monitoring information 300 can be used to determine what type of hazardous event or events may be occurring, as described below in more detail with regard to the following FIGS. 4 and 5.

Although the monitoring information 300 includes only measurements taken at a particular time, additional measurements can be taken at various times, depending on the implementation. These additional measurements can then be used to compare signal strengths over time for various devices connected to the cellular base station. According to various embodiments, monitoring information gathered for several devices and at different times can help determine the start and progression of a hazardous event.

As described with regard to various embodiments, monitoring information can be used to identify and determine a cause for a variation in signal strength outside of a designated threshold. In particular, this monitoring information can be used to identify a hazardous event, such as a fire, smoke, rain, hail, etc. In some examples, particular information about the hazardous event can also be determined based on the monitoring information gathered. For instance, the location and size of the hazardous event can be determined for a particular moment in time. Additionally, changes in the conditions of the hazardous event can also be determined from monitoring information gathered at various times. Specifically, the growth, spread, and intensity of a hazardous condition can be determined. According to various implementations, this information can be used to determine the severity of a hazardous condition and help responders determine how to address the hazardous condition.

Operating Examples

Figure 4:
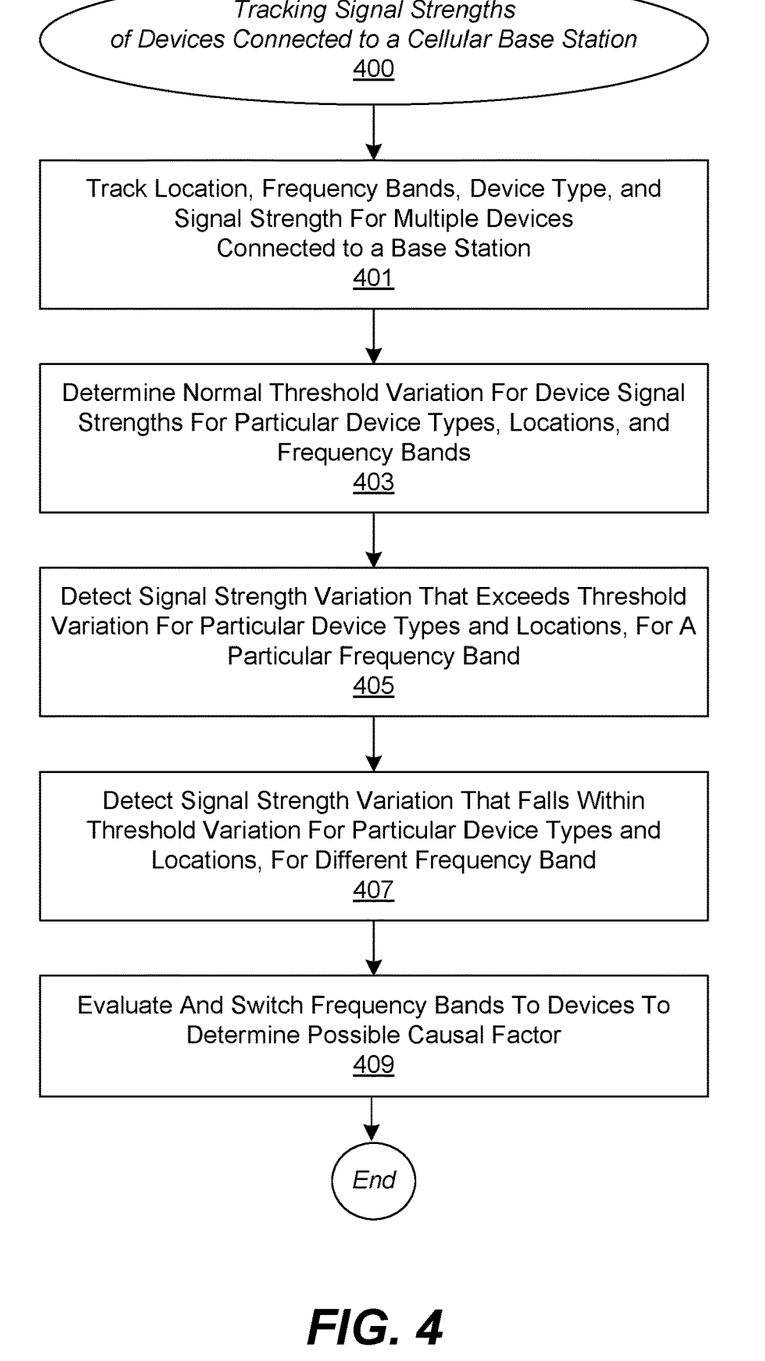
FIG. 4 illustrates one example of a technique for tracking signal strengths of devices connected to a cellular base station.

According to various embodiments, monitoring information can be used to track the signal strengths of devices connected to a cellular base station. With reference to FIG. 4, shown is one example of a technique for tracking the signal strengths of devices connected to a cellular base station. In particular, this example illustrates a process 400 for tracking signal strengths, detecting signal strength variations, and determining a possible causal factor. In some implementations, this process can be performed by a system, such as the one described above with regard to FIG. 1.

In the present example, the process 400 begins at 401 by obtaining tracking information that includes location, frequency bands, device type, and signal strength for multiple devices connected to a base station. As described previously with regards to FIGS. 1 and 2, one or more cellular base stations can receive this tracking information for multiple devices, such as mobile devices, stationary devices, etc., depending on the implementation. Specifically, tracking information can be obtained for each device connected to a base station, an example of which is shown and described with regard to FIG. 3. As previously described, the information displayed in the table 300 represents data collected for a particular moment in time. For a particular device, this information includes location (e.g. 231.23 343.34), frequency band (e.g. 1,900 MHz), device type (e.g. mobile device), and signal strength (e.g. −95 dBm).

Next, at 403, this process continues by determining a normal threshold variation for device signal strengths for particular device types, locations, and frequency bands. In particular, this threshold variation can be determined based on the expected and/or observed values for data obtained during clear, hazard-free conditions. For instance, the threshold variation may be designated as plus or minus 15 dBm for a particular frequency band. Similarly, the threshold variation may be designated as plus or minus 25 dBm for a different frequency band. This threshold variation can be determined in various ways, such as by observing values during non-hazardous events. Depending on the amount of sensitivity desired, the acceptable range of threshold variation can be chosen accordingly.

In some embodiments, the normal threshold variation is determined based on a signal strength profile. Specifically, for a particular frequency band, a signal strength profile is generated for multiple devices connected to the cellular base station. Similarly, a signal strength profile can also be generated for multiple devices connected to the cellular base station for other frequency bands. According to various embodiments, a signal strength profile for multiple devices can be used to determine the normal threshold variation of signal strengths at a particular frequency band depending on the sensitivity desired in detection.

In the present example, the process continues at 405 by detecting signal strength variation that exceeds the threshold variation determined at 403 for particular device types and locations, for a particular frequency band. For instance, as described previously with regard to FIG. 3, a particular set of monitoring information includes data for devices connected to a cellular base station at a particular moment in time. At the moment depicted, four of the devices 301, 303, 305, and 307 have signal strength variations that fall outside of the threshold designated for the frequency band of 600 MHz. Similarly, at the moment depicted, three of the devices 313, 315, and 319 have signal strength variations that fall outside of the threshold designated for the frequency band of 1900 MHz.

Next, the process continues at 407 by detecting signal strength variation that falls within the threshold variation determined at 403 for particular device types and locations, for a different frequency band. Referring again to FIG. 3, two of the devices 309 and 311 have signal strength variations that fall within of the threshold designated for the frequency band of 600 MHz at the moment depicted in the table. Similarly, at the moment depicted, seven of the devices 317, 321, 323, 325, 327, 329, and 331 have signal strength variations that fall within the threshold designated for the frequency band of 1900 MHz. In the present example, if one or more devices in a particular location have signal strength variations that fall within the threshold for a particular frequency band, and the same one or more devices or similarly located devices have signal strength variations that fall outside of the threshold for a different frequency band at a particular moment in time, then a determination can be made that a possible hazardous event is present.

According to various embodiments, once a determination is made that a hazardous event may exist, then additional information may be desired such as the location and cause of the hazardous event. With regard to the present example, the process continues at 409 once a signal strength variation is detected outside of the threshold for a particular frequency band and within the threshold for a different frequency band. In particular, at 409, connections between the base station and devices are switched to different frequency bands and evaluated. Depending on the signal strength variations observed at these different frequency bands, a determination can be made about a possible causal factor for the possibly hazardous event. For instance, if a certain type of smoke with a particular density is present, signal strength variations may fall outside of the threshold for certain frequency bands but within the threshold for other frequency bands. If these signal strength variations are observed, then a determination can be made that this type of smoke may be the causal factor for the variation. Similarly, if a certain type of gas is present (such as a gas leak), signal strength may fall outside of the threshold for particular frequency bands but within the threshold for other frequency bands. A distinction can be made between causal factors based on the different combinations of signal strength variations at different frequency bands.

In the present example, signal strengths are tracked for multiple devices connected to a base station and monitored at different frequency bands. In some implementations, the multiple devices can include a subset of devices that are monitored at one frequency band and another subset of devices that are monitored at another frequency band.

Furthermore, in various embodiments, the locations of the devices can be dispersed throughout a particular area such that each subset similarly covers the area. In this manner, multiple devices can be used to simultaneously monitor a particular location/area at different frequency bands. However, if there are many mobile devices included in a set of the devices being monitored, it may be helpful to track whether the mobile devices change positions over time or if they are relatively non-changing in location. If the mobile devices are observed to change positions over time, frequency bands assigned to various mobile devices may need to be updated in order to improve coverage of the monitored area. For stationary devices and mobile devices that are placed in fixed or relatively non-moving positions, the frequency bands assigned to particular devices can be established based on their respective locations to achieve desired coverage of the area monitored.

In some implementations, the multiple devices can be monitored at two or more frequency bands by alternating the frequency bands. For instance, monitoring information for a single device may be collected for a first frequency band at one moment in time, and then for a second frequency band at another moment in time. If these two moments in time are taken closely together, a comparison can be made to determine whether there is a signal strength variation at around that time and location. In this implementation, each device can be monitored for the two frequency bands periodically and location information for each device can be monitored to evaluate the overall coverage of the tracking area.

As described, the present example involves the use of multiple devices connected to a base station. In some implementations, the mobile devices may include one or more user devices. In these implementations, costs may be lower because these mobile devices are not part of the infrastructure costs of the monitoring system. However, these user controlled mobile devices may also move around in unpredictable ways and the number of these devices may vary greatly. Accordingly, using data gathered from user controlled devices may be more useful in some implementations than others. In some implementations, stationary devices may be installed and spaced apart in a manner that would create desirable coverage for the monitoring area. The locations of these stationary devices would be fixed at any given time and would be more predictable than user controlled devices that may be changing locations over time. In yet other implementations, mobile devices may be controlled by whoever is operating the monitoring system. Specifically, the mobile devices may be owned and/or controlled by an administrator of the system and placed in locations that would create desirable coverage for the monitoring area. These mobile devices could be intentionally moved depending on the situation. In some implementations, these mobile devices could be placed in stationary positions, thereby mimicking stationary devices. In these implementations, using mobile devices may be more cost effective if stationary devices are more expensive to obtain. Furthermore, mobile devices can be moved or reused at other locations or for other systems in the future.

After a variation in signal strength is identified, it may be desirable to determine the cause of the variation. As described above, one way to determine the cause of the variation is to evaluate signal strengths over multiple frequency bands to determine which frequency bands are most affected. From this information, a determination can be made about the cause. For instance, if smoke is expected to affect five frequency bands in different ways, and if the signal variations detected are consistent with the signal variations observed when smoke is present, a determination can be made that smoke is the causal factor for the variation. In other words, if a signal strength variation is indicative of a hazardous event, then matching the observed signal strength variations with signal strength variations corresponding to a known cause can help identify the type of hazardous event that may be present.

According to various embodiments, once a variation in signal strength is determined, thereby indicating the possible presence of a hazardous event, it may be desirable to confirm the causal factor of the variation. One or more techniques can be used to confirm the causal factor, depending on the desired sensitivity and unique characteristics of the area being monitored. If the causal factor is confirmed to be a hazardous event, then alerts can be sent to a control center or other appropriate entities.

Figure 5:
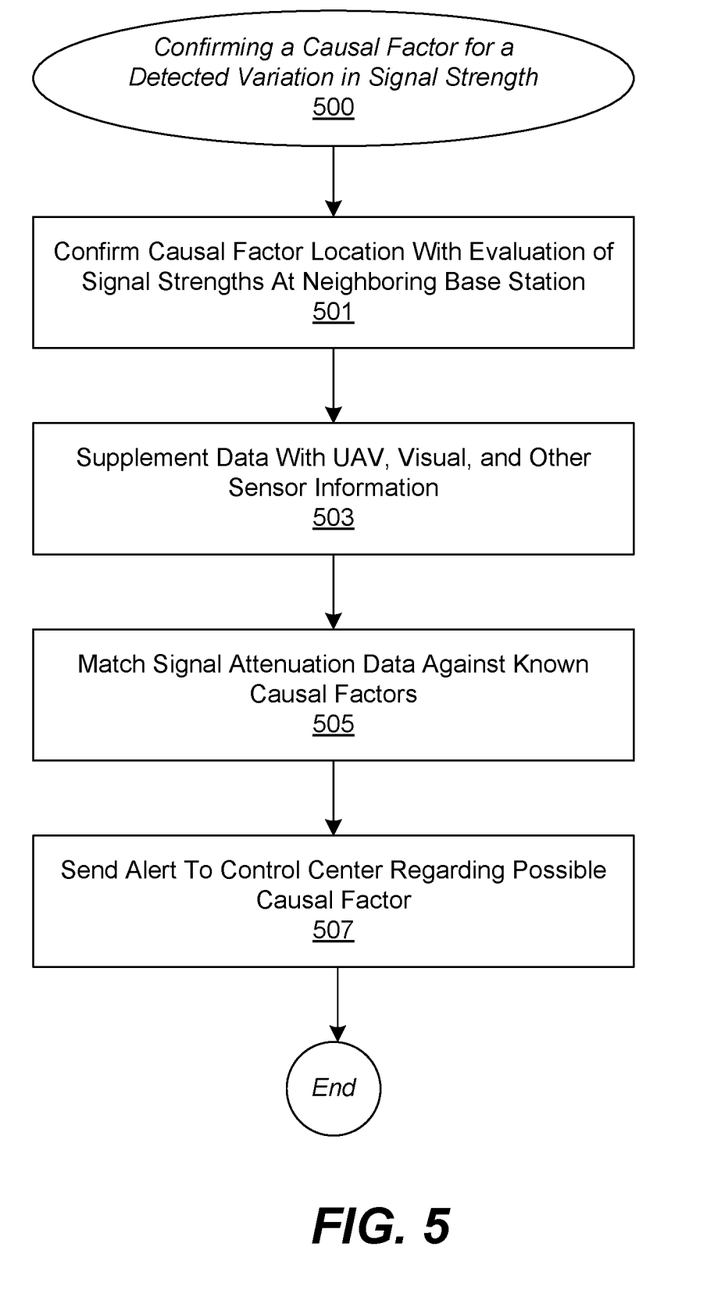
FIG. 5 illustrates one example of a technique for confirming a causal factor for a detected variation in signal strength.

With reference to FIG. 5, shown is one example of a technique 500 for confirming a causal factor for a detected variation in signal strength. In particular, the technique shown includes multiple approaches to confirming a causal factor that are performed sequentially. Each approach considers different aspects that would support a finding of a particular causal factor. Accordingly, each additional approach increases the certainty that a particular causal factor is present.

In the present example, confirming a causal factor begins with the first approach 501, which involves evaluating signal strengths at a neighboring base station. Specifically, once a variation in signal strength is detected at a particular cellular base station, location information for the devices affected can be obtained. This information can be used to determine the general location of a potentially hazardous event. To confirm this location information, signal strengths of these devices can then be evaluated from a neighboring base station. Depending on the signal strengths observed from the neighboring base station, the location of the potentially hazardous event can be identified more accurately. For instance, if a fire is located between a set of devices and the first base station, but not between the set of devices and the second base station, then the signal strength variation would be expected to be higher for the readings taken from the first base station. Comparing signal strengths of different devices at various locations can help to improve the accuracy of the location. In some implementations, evaluating signal strength variations from additional neighboring base stations can help locate the causal factor even more accurately.

According to various embodiments, the next approach 503 for confirming a causal factor for a variation in signal strength involves supplementing the data with UAV, visual, and/or other sensor information. For instance, one or more UAVs, such drones or other devices, can be used to visit the physical location or locations detected and confirmed in approach 501. Depending on the desired implementation, the UAVs can gather additional information from the specific location identified. In some examples, the UAVs can include one or more cameras that can provide visual information such as photographs and/or video footage of the location. Furthermore, in some examples, the UAVs can include sensors that can detect various conditions such as temperature, humidity, wind, sounds, etc. Depending on the implementation, this information can be transmitted during a live or nearly live feed while the data is being gathered at the location. In some embodiments, the UAVs can be monitored and controlled such that desired data can be obtained in real time. For instance, if initial photographs or videos do not provide a clear indication of the causal factor, the UAVs can be repositioned to collect data from different angles, etc. Accordingly, if smoke and fire are present at the location identified, the UAVs can provide photos and video footage that confirm the existence of the smoke and fire. Furthermore, sensor data, if collected, can provide information such as the type and intensity of smoke and fire present. For instance, the sensor data can be used to distinguish whether a pile of wood and natural debris is burning or whether a pile of plastic items is burning. This information can be useful in deciding how to approach and remedy the hazardous event.

In the present example, the next approach 505 for confirming a causal factor is to match signal attenuation data against known causal factors. For instance, if it is known that wildfire smoke from burning of natural substances affects transmission strength at one frequency band more than at another frequency band, such that the particular signal attenuation data at the two frequency bands occurs during this type of hazardous event in a reproducible manner, then this particular set of signal variation can be associated with a known causal factor of wildfire smoke from burning of natural substances. Specifically, if attenuation data collected at a particular location matches the signal attenuation data associated with the known causal factor of wildfire smoke from burning of natural substances, then the causal factor of the observed signal variation can be determined to be wildfire smoke from burning of natural substances.

Similarly, if it is known that wildfire smoke from burning of synthetic materials affects transmission strength at one frequency band more than at another frequency band, such that the particular signal attenuation data at the two frequency bands occurs during this type of hazardous event in a reproducible manner, then this particular set of signal variation can be associated with a known causal factor of wildfire smoke from burning of synthetic materials. Specifically, if attenuation data collected at a particular location matches the signal attenuation data associated with the known causal factor of wildfire smoke from burning of synthetic materials, then the causal factor of the observed signal variation can be determined to be wildfire smoke from burning of synthetic materials.

In another example, if it is known that a weather event affects transmission strength at one frequency band more than at another frequency band, such that the particular signal attenuation data at the two frequency bands occurs during this type of weather event in a reproducible manner, then this particular set of signal variation can be associated with a known causal factor of this type of weather event. Specifically, if attenuation data collected at a particular location matches the signal attenuation data associated with the known causal factor of this type of weather event, then the causal factor of the observed signal variation can be determined to be this particular type of weather event.

Of course, there can be many different causal factors that can affect signal strength variation, including both hazardous and non-hazardous events. Accordingly, known causal factors can include a range of events, such as fire, smoke, rain, snow, hail, fog, gas leak, pollen, insect swarms, etc. If there is associated data for these known causal factors, then matching collected signal attenuation data to this data can aid in determining that one of these known causal factors is present. Additionally, data corresponding to known causal factors can also help eliminate particular causes if the collected data does not match the data associated with known causal factors.

In the present example, once a causal factor is confirmed by using one or more of the approaches described above, then at 507, an alert is sent to an appropriate authority regarding the possible causal factor or factors. Depending on the implementation, the alert can be sent to a logistics and support entity. For instance, an alert can be sent to a public agency such as a fire department, forestry department, or other monitoring entity. In other examples, this alert can be sent to a control center or administrator of the tracking system, which can be a private entity, company, or individual. Depending on how the tracking system is designed for a particular area, one or more logistics and support entities may be alerted by the system.

Although the present example includes particular techniques for confirming a causal factor, various techniques can be used depending on the desired implementation of the monitoring system. For instance, in some implementations, using only one of the techniques may provide enough information to confirm a causal factor. In other implementations, perhaps a different combination of techniques would be more appropriate. In yet other examples, additional techniques can also be included. Additionally, the various techniques can be performed in a different order from the one shown and described with regard to FIG. 5.

As described in various examples, a system that detects cellular signal degradation, such as the system 100 described with regard to FIG. 1, can be used to identify when and locate where particular events occur. Detecting certain events, such as hazardous events, may be particularly helpful for support entities that are equipped to address hazardous events. Furthermore, detecting hazardous events early can help responders address the events before they grow or become more severe. This is particularly helpful in locations and areas that are not easily seen or noticed before the hazardous event has grown to a significant size. For instance, in a remote forest area that is not inhabited, a fire could start and spread significantly before anyone notices. By the time responders are aware of the fire, it may be hard to contain or battle the fire, and containment may take an extended amount of time. If the fire were detected sooner, it would be easier and faster to contain and eventually extinguish.

Figure 6:
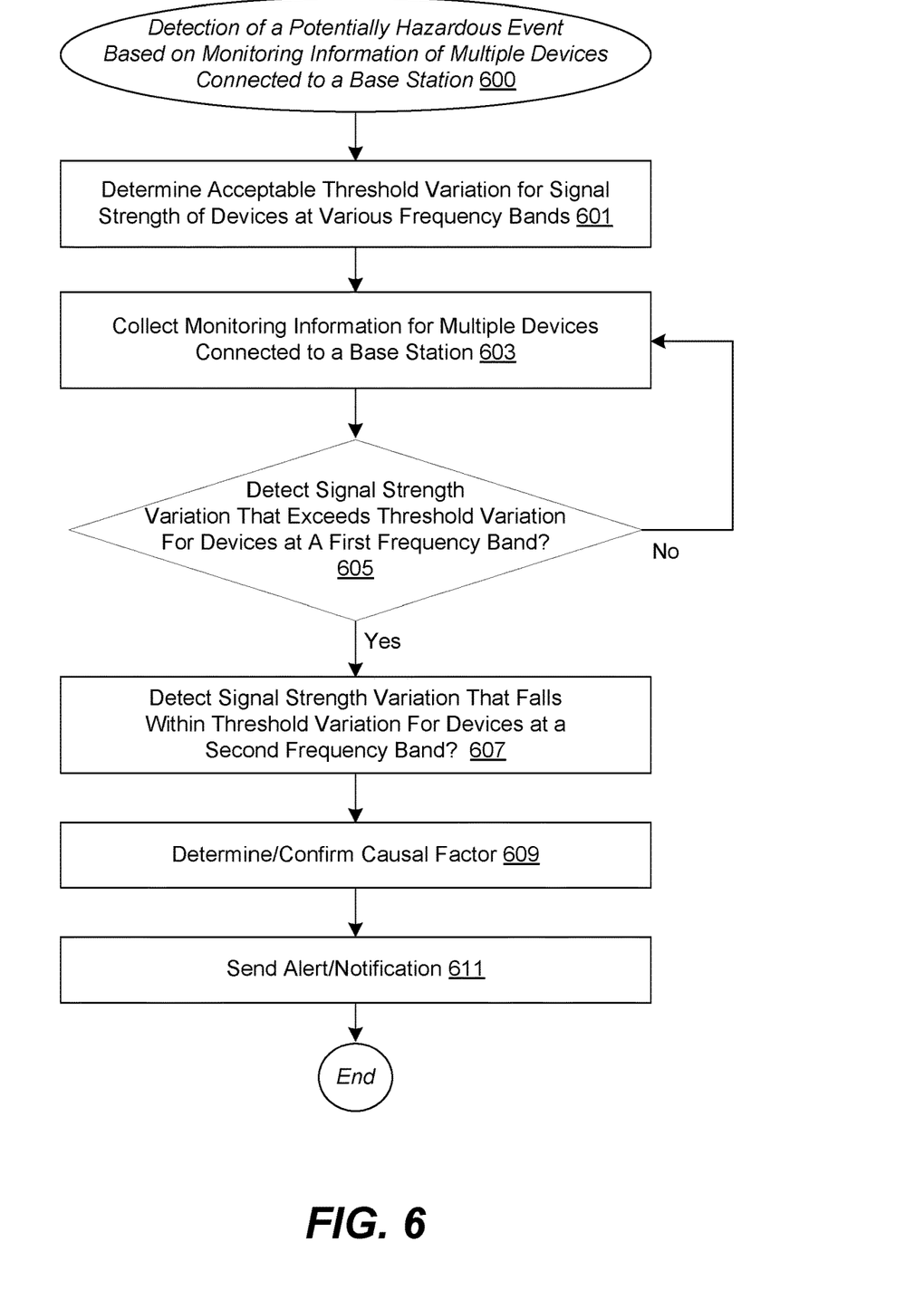
FIG. 6 illustrates one example of a technique for detecting a potentially hazardous event based on monitoring information collected for multiple devices connected to a base station.

With reference to FIG. 6, shown is one example of a technique 600 for detecting a potentially hazardous event based on monitoring information collected for multiple devices connected to a base station. As previously mentioned, identifying potentially hazardous events is helpful for support entities tasked with containing and remedying such events. This technique is especially helpful for alerting these support entities when a hazardous event is detected.

In the present example, using a system such as the system 100 depicted with regard to FIG. 1, the process 600 for detecting potentially hazardous events begins at 601 by determining acceptable threshold variations at various frequency bands for cellular signal strength of devices connected to a cellular base station. These threshold variations represent the expected signal strength variations for non-hazardous conditions at the respective frequency bands. These threshold variations can be established based on the sensitivity of detection desired, and can also be customized based on the needs of the local terrain and conditions.

Next, at 603, monitoring information is collected for multiple devices connected to a cellular base station. As described above with respect to FIGS. 2 and 3, this information may include data such as location information, frequency band, signal strength, type of device, etc. for each of the multiple devices connected to the base station. Depending on the implementation, this monitoring information can be stored so that the information is available for analysis at various times. For instance, this information can be used to monitor changes in conditions over time in some examples. Additionally, the types of devices connected to the cellular base station may vary depending on the implementation. For instance, the multiple devices may include mobile devices, stationary devices, or a combination of mobile and stationary devices. In some examples, the multiple devices are relatively unchanging in location.

In the present embodiment, once monitoring information is collected for a particular moment in time, a determination is made at 605 about whether signal strength variation exceeds the acceptable threshold variation for devices at a first frequency band. If not, then the signal strength for the devices falls within the threshold variation for the devices at the first frequency band and the collection of monitoring information continues at 603.

However, if signal strength variation exceeds the acceptable threshold variation established previously for devices at a first frequency band, then a determination is made at 607 about whether signal strength variation falls within the threshold variation for devices at a second frequency band. As described above with regard to various examples, if a threshold variation is exceeded at one frequency band but not another, then this can indicate that there may be a hazardous event and may even suggest the type of event depending on how the signal strengths are affected across these frequency bands. In some instances, the signal strength variation at the second frequency band may also exceed the threshold variation. In these cases, this may further confirm the condition detected at the first frequency band or provide further information about the location and type of condition detected.

In the present example, once a signal strength variation has been detected that falls outside of the acceptable threshold variation for at least one of the frequency bands being monitored by the system, a causal factor can be determined and/or confirmed at 609. Various techniques can be used to confirm a causal factor, such as the ones described above with regard to FIG. 5. Depending on the implementation of the system, one or more techniques can be used to determine and/or confirm a causal factor.

Once a causal factor is determined and/or confirmed, then an alert and/or notification is sent at 611. As described in more detail above with regard to previous examples, an alert and/or notification can be sent to an appropriate entity, such as an administrator, first responder, agency, etc. In some examples, the system can be operated by a private entity and provide information about the entity's property to allow early and quick response to any hazardous event detected. In other examples, the system can be operated by a governmental entity and provide information about the conditions about the property to allow early and quick response by fire departments, emergency crews, or other support entities to any hazardous event detected.

In some examples, this process continues such that monitoring information is continually collected, signal strength variations evaluated, and notifications/alerts are sent. Accordingly, in some examples, the process shown in FIG. 6 would not necessarily end after an alert/notification is sent at 611. Instead, the process would continue by looping back to a previous step, such as collecting monitoring information at 603. In some implementations, monitoring information can be collected continuously, at specified time intervals, or on demand.

Figure 7:
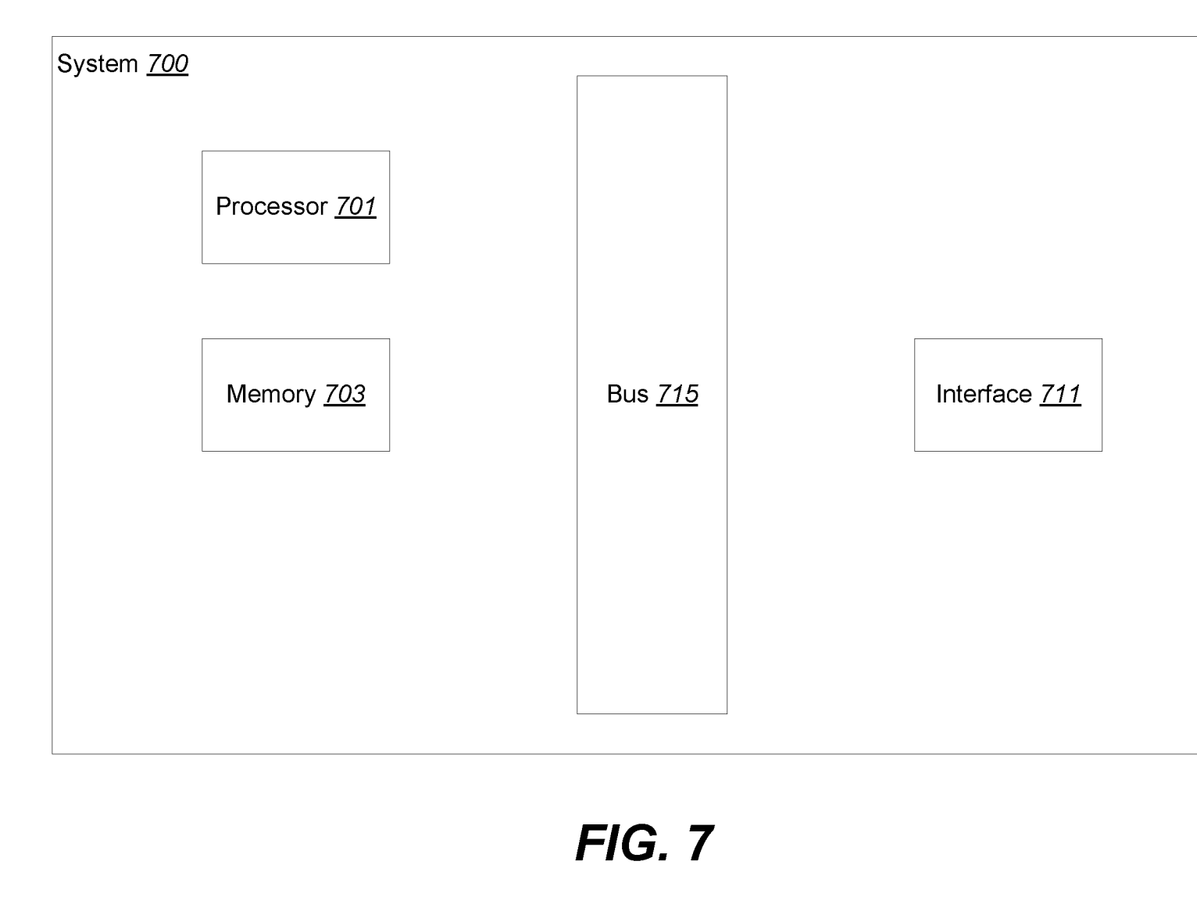
FIG. 7 illustrates one example of a computer system.

With reference to FIG. 7, shown is a particular example of a computer system that can be used to implement particular examples of the present invention. For instance, the computer system 700 can be used to implement a computing device, such as a mobile device, stationary device, computer, laptop, monitoring system, control system, etc., according to various embodiments described above. According to particular example embodiments, a system 700 suitable for implementing particular embodiments of the present invention includes a processor 701, a memory 703, an interface 711, and a bus 715 (e.g., a PCI bus). The interface 711 may include separate input and output interfaces, or may be a unified interface supporting both operations. When acting under the control of appropriate software or firmware, the processor 701 is responsible for such tasks such as optimization. Various specially configured devices can also be used in place of a processor 701 or in addition to processor 701.

The complete implementation can also be done in custom hardware. The interface 711 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 700 uses memory 703 to store data and program instructions and maintain a local side cache. The program instructions may control the operation of an operating system and/or one or more applications, for example. The memory or memories may also be configured to store received metadata and batch requested metadata.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

CONCLUSION

While the present disclosure has been particularly shown and described with reference to specific embodiments thereof, it will be understood by those skilled in the art that changes in the form and details of the disclosed embodiments may be made without departing from the spirit or scope of the invention. Specifically, there are many alternative ways of implementing the processes, systems, and apparatuses described. It is therefore intended that the invention be interpreted to include all variations and equivalents that fall within the true spirit and scope of the present invention. Moreover, although particular features have been described as part of each example, any combination of these features or additions of other features are intended to be included within the scope of this disclosure. Accordingly, the embodiments described herein are to be considered as illustrative and not restrictive. Furthermore, although the foregoing concepts have been described in some detail for purposes of clarity of understanding, it will be apparent that certain changes and modifications may be practiced within the scope of the appended claims.

What is claimed is:

1. A method comprising:
   determining a first plurality of signal strengths at a first frequency band for a first plurality of devices connected to a first cellular base station;

determining a second plurality of signal strengths at a second frequency band for the first plurality of devices connected to the first cellular base station;

detecting variation in the first plurality of signal strengths at the first frequency band that falls within a threshold variation;

detecting variation in the second plurality of signal strengths at the second frequency band that exceeds the threshold variation;

determining a causal factor for the variation in the second plurality of signal strengths at the second frequency band that exceeds the threshold variation while the variation in the first plurality of signal strengths at the first frequency band falls within the threshold variation; and triggering an alert for the causal factor.

2. The method of claim 1, further comprising generating a signal strength profile at the first frequency band for the first plurality of devices.

3. The method of claim 2, further comprising generating a signal strength profile at the second frequency band for the first plurality of devices.

4. The method of claim 1, wherein the first plurality of devices is a first plurality of mobile devices.

5. The method of claim 1, wherein the first plurality of devices comprise mobile devices and stationary devices.

6. The method of claim 1, wherein the first cellular base station is a cellular-enabled mobile device site where antennas and electronic communications equipment connect the first plurality of devices to a base station network.

7. The method of claim 1, wherein the first plurality of devices are relatively unchanging in location.

8. The method of claim 1, wherein the causal factor is wildfire smoke from burning of natural substances that affects transmission strength at the second frequency band more than at the first frequency band.

9. The method of claim 1, wherein the causal factor is smoke from burning of synthetic materials that affects transmission strength at the second frequency band more than at the first frequency band.

10. The method of claim 1, wherein the causal factor is a weather event that affects transmission strength at the second frequency band more than at the first frequency band.

11. The method of claim 1, wherein the first threshold variation is plus or minus 15 dBm.

12. The method of claim 1, wherein the first threshold variation is plus or minus 25 dBm.

13. A system comprising:
a cellular base station transceiver configured to detect a first plurality of signal strengths at a first frequency band for a first plurality of devices and a second plurality of signal strengths at a second frequency band for the first plurality of devices connected to the first cellular base station;

a monitoring system configured to detect variation in the first plurality of signal strengths at the first frequency band that falls within a threshold variation and detect variation in the second plurality of signal strengths at the second frequency band that exceeds the threshold variation; and a control system configured to determine a causal factor for the variation in the second plurality of signal strengths at the second frequency band that exceeds the threshold variation while the variation in the first plurality of signal strengths at the first frequency band falls within the threshold variation and trigger an alert for the causal factor.

14. The system of claim 13, wherein the monitoring system generates a signal strength profile at the first frequency band for the first plurality of devices.

15. The system of claim 14, wherein the monitoring system generates a signal strength profile at the second frequency band for the first plurality of devices.

16. The system of claim 13, wherein the first cellular base station is a cellular-enabled mobile device site where antennas and electronic communications equipment connect the first plurality of devices to a base station network.

17. The system of claim 13, wherein the causal factor is wildfire smoke from burning of natural substances that affects transmission strength at the second frequency band more than at the first frequency band.

18. The system of claim 13, wherein the causal factor is smoke from burning of synthetic materials that affects transmission strength at the second frequency band more than at the first frequency band.

19. The system of claim 13, wherein the causal factor is a weather event that affects transmission strength at the second frequency band more than at the first frequency band.

20. The system of claim 13, wherein the first threshold variation is plus or minus 15 dBm.

* * * * *